United States Patent [19]
Lechner

[11] 4,129,190
[45] Dec. 12, 1978

[54] WEIGHING APPARATUS INCLUDING DISPLAY CONTROL MEANS

[75] Inventor: Hanspeter Lechner, Wetzikon, Switzerland

[73] Assignee: Mettler Instrumente AG, Greifensee, Switzerland

[21] Appl. No.: 821,417

[22] Filed: Aug. 3, 1977

[30] Foreign Application Priority Data

Aug. 19, 1976 [CH] Switzerland .................. 10556/76

[51] Int. Cl.² .................. G01G 23/02; G01G 19/52
[52] U.S. Cl. .................................. 177/155; 177/50
[58] Field of Search ............... 177/154, 159, 190, 191, 177/DIG. 3, 50

[56] References Cited

U.S. PATENT DOCUMENTS 3,720,275  3/1973  Chmielewski et al. ........ 177/DIG. 3

Primary Examiner—George H. Miller, Jr.
Attorney, Agent, or Firm—Lawrence E. Laubscher

[57] ABSTRACT

Weighing apparatus is disclosed including an operating device for displacing a weighing beam arresting assembly to its arresting position, and for simultaneously effecting illumination of all of the segments of a multi-segment display device. In one embodiment, a manually operable rotatable shaft is provided having a pair of cams thereon for operating the beam arresting assembly and for operating a switch to cause illumination of all of the display segments, respectively. In a second embodiment, closing of a switch to effect illumination of all of the display segments is accompanied by the energization of a motor to displace the arresting assembly to its arresting position.

5 Claims, 3 Drawing Figures (DRAWN FOR POSITION "ARRESTED")

WEIGHING APPARATUS INCLUDING DISPLAY CONTROL MEANS

BACKGROUND OF THE INVENTION

Analytical balances have been proposed including means for arresting the weighing assembly of the balance, which assembly comprises, for example, a balance beam supported on a knife edge. The purpose of the arresting device is to protect the beam from jolts or impact loadings when the weighing assembly is not in its operative condition for weighing and the device includes an arresting mechanism which can be moved, by at least one operating element, into its beam-arresting condition.

However, such balances may be of widely varying constructions and modes of weighing operation. For example, in many kinds of balances the balance may have compensation means or substitution weights which are brought into operation in order to increase the weighing range of the balance. The weights may be simple mechanical weights which are selectively switched into an operative position in order to change the weighing range of the balance so as to include therein the weight of the article or material to be weighed, or alternatively, in the case of purely electrical balances the weights are formed by switchable current stages. With this arrangement, when the balance has a seven-segment display for displaying at least some weight decimals, the seven-segment display can be a part of the weighing result, or when the switchable weights are in their operative condition, it can be the entire weighing result. The fine weighing range, without the compensation weights, can be a range of inclination movement of, for example, the balance beam, the angle of beam inclination which is dependent on weight being sensed by way of code tracks, resulting in the supply of signals which are thus proportional to the weight to be measured; the display is thus actuated in response to said signals to display the weight determined by the balance. Alternatively, the balance may have electromagnetic compensation means in which the weight to be determined is counteracted by an electromagnetic assembly the current flowing therein thus representing a measurement of the weight to be determined.

In the case of balances with additional or compensation weights, as mentioned above, the arresting device can have a coarse or pre-weighing position in which the weighing assembly is partly arrested, and the arresting device can be actuated by hand by means of an actuating element such as cam discs, although more convenient balances often include a servo motor which is controlled, for example, by means of press keys.

In a balance with a seven-segment display, there is always the problem of monitoring or checking the operation of the segments in order to avoid defective readings caused by the failure of one or more segments. It has been previously proposed that a separate press key may be provided on the housing of the balance or on a control member, such separate press key when actuated causing all the segments to be simultaneously illuminated for monitoring purposes. This construction however, presupposes a deliberate intention on the part of the operator to carry out such a monitoring operation.

Another previous proposal is that of activating all the segments for a short period, such as a few seconds, when the balance is switched on. A disadvantage of this is that when the balance is used in conditions such that it is switched on, for example, only once in a day, perhaps because of the warming-up time required to be observed when first switching on, and then remains on until the end of the day, there is no further monitoring of the segments unless it occurs to the operator now and then to switch the balance on and off in the course of his working day.

SUMMARY OF THE INVENTION

The present invention was developed to avoid the above and other drawbacks of the known weighing apparatus.

In accordance with a primary object of the invention, the weighing apparatus is provided with operating means for simultaneously displacing the weighing beam arresting assembly to a predetermined position relative to the scale frame, and for effecting illumination of all of the segments of a multi-segment display device. In one embodiment of the invention, there is provided a manually operable operating shaft having a pair of cams mounted thereon for respectively displacing the arresting assembly to a given position relative to the frame, and for operating switch means to effect illumination of all the segments of a multi-segment display device. In a second embodiment, closing of a switch for effecting illumination of all of the display segments is accompanied by the energization of a motor to displace the arresting assembly to its arresting position.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
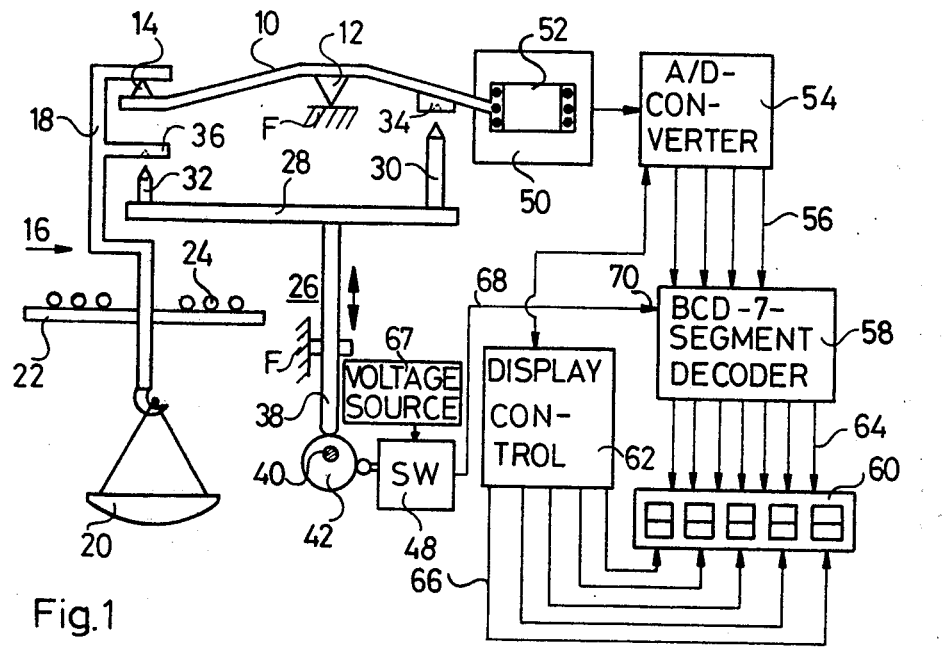
FIG. 1 is an electrical block diagram of the weighing apparatus of the present invention.
Figure 2:
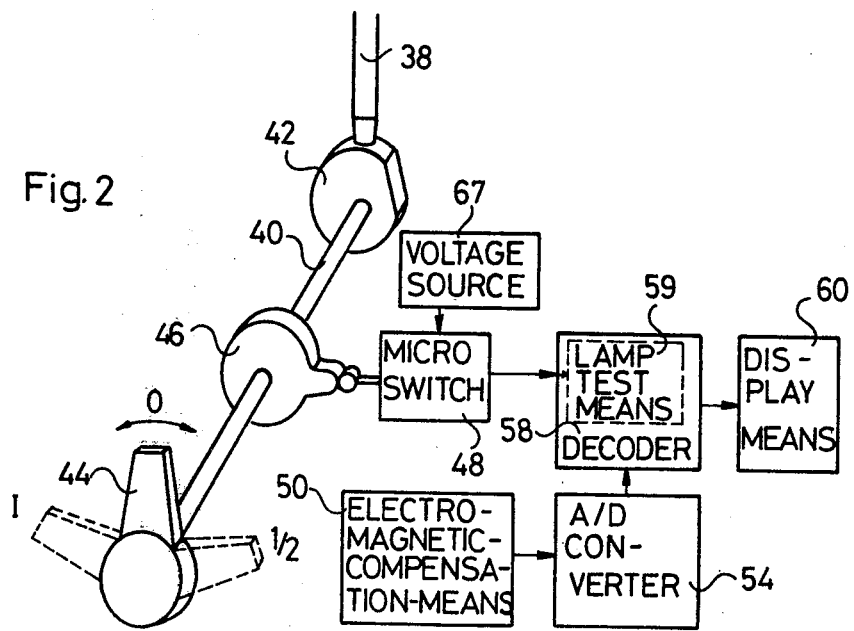
FIG. 2 is a perspective view of the manually operable rotary shaft means of FIG. 1 for simultaneously operating the beam arresting means and for effecting illumination of all of the display segments.

Referring first more particularly to FIGS. 1 and 2, the weighing apparatus includes a beam balance provided with electromagnetic compensation means in the fine weighing range and mechanical switchable substitution weights. Examples of weighing apparatus of the electromagnetic compensation type are disclosed in the U.S. patents to Baumgartner No. 3,677,357, Strobel U.S. Pat. No. 3,688,854, Strobel et al U.S. Pat. Nos. 3,789,937 and 3,986,571, Kunz U.S. Pat. Nos. 3,786,678 and 3,786,883, and Allenspach U.S. Pat. No. 3,786,884, among others. The weighing apparatus includes a balance beam 10 which is pivotally mounted on the balance frame F by means of a main knife edge 12. The beam 10 supports a suspended assembly 16 which is suspended from a knife edge 14 adjacent one end of the beam 10 and which includes a suspension support member 18 from the lower end of which is suspended a weighing pan 20. Arranged above the weighing pan on a cantilever arm 22 is a set of substitution weights 24 which may be substituted or arranged as is known in the art.

The balance also includes arresting means 26 comprising a vertically movable rod 38, a lifting beam 28 carried by the rod 38, and longer and shorter centering pin means 30 and 32, respectively, carried by the beam 28 for engagement with corresponding recesses or openings contained in plates 34 and 36 on the beam and on the suspension assembly 16, respectively, thereby to arrest the beam 10 and its associated components 16, 20, while also having a centering action thereon. The rod 38 is movable vertically in guides G, by means of a cam 42 mounted on a rotary horizontal actuating shaft 40. As shown in FIG. 2, the shaft 40 carries a manual actuating element in the form of a lever 44 mounted at one end of the shaft 40 outside the balance housing (not shown). In addition, the shaft 40 has mounted thereon a switching cam 46 for operating a microswitch 48 to supply a signal to the test terminal of the lamp test means 59. The lever 44 can be replaced, of course, by other forms of manual actuating elements, such as a rotary knob.

The balance of FIG. 1 also includes electromagnetic compensation means 50 for the compensation of the load to be weighed in the known manner, which compensation means are arranged at the end of the balance beam 10 remote from the knife edge 14. As is known in the art, the electromagnetic compensation means 50 includes a movable coil 52, and the output signal of the device 50, which is proportional to the load to be weighed, is put into digital form in an A/D-converter 54 and passed in BCD-code form by means of leads 56 to a code converter 58 (specifically, a BCD-7-segment decoder). One example of such a decoder is the Motorola Decoder Model No. MC 14511, which decoder is provided with a lamp test input 70 which, when in a defined state (e.g., a low state) causes the illumination for checking purposes of all of the segments of the seven-segment display device 60 connected with the decoder output terminals. A display control unit 62 controls the association of the data. For example, in a time multiplexing method, the individual decimals of the display 60 are each activated only for a short time, although a display which seems stable to the eye is provided by suitably rapid repetitive forward switching of the individual decimals by way of leads 66.

The voltage source 67 is connected via microswitch 48 and a lead 68 to the lamp test input 70 of decoder 58, whereby all the segments of all decimals of the display 60 are simultaneously illuminated.

FIG. 2 shows the association between the display circuit of FIG. 1 and the position of the arresting mechanism 26. If the lever 44 is pivoted toward position I (corresponding to the position of the cam 42 shown in FIG. 1), the beam 10 is completely free to move, and the switch 48 is also unactuated, so that weighing can be effected and the display 60 operates normally to provide a display of the weighing result.

In the position O of the lever 44 (shown in solid lines in FIG. 2), the beam 10 is arrested by the pin means 30, 32, and the two knife edges 12 and 14 are relieved of their loads. The switching cam 46 actuates the switch 48 to supply a signal to the lamp test input of the decoder 58, whereupon all the segments of the display 60 are illuminated. This condition persists until the switch 48 is released again by rotation of the shaft 40, by moving the lever 44 into position I or into position ½. In position ½, the beam 10 is partially released, that is to say, the lifting beam 28 is lowered only so far that the beam 10 can perform a limited travel movement about its knife edge 12 (smaller movements than in position I). This reduced travel movement has an advantageous effect, as regards a reduced settling time in respect of the swinging movement of the beam 10. In position ½, the weights 24 can be switched into position until the electrical weighing range of the balance is reached (the electrical weighing range cam comprise, for example, 1 gram, with a total weighing range of 200 grams).

Although the above-described balance has manual actuation of the shaft 40, if the balance has a servo motor for driving the arresting shaft 40, in known manner, the display monitoring circuit of FIG. 1 can be controlled by way of the cam 46 nonetheless, as described below.

Figure 3:
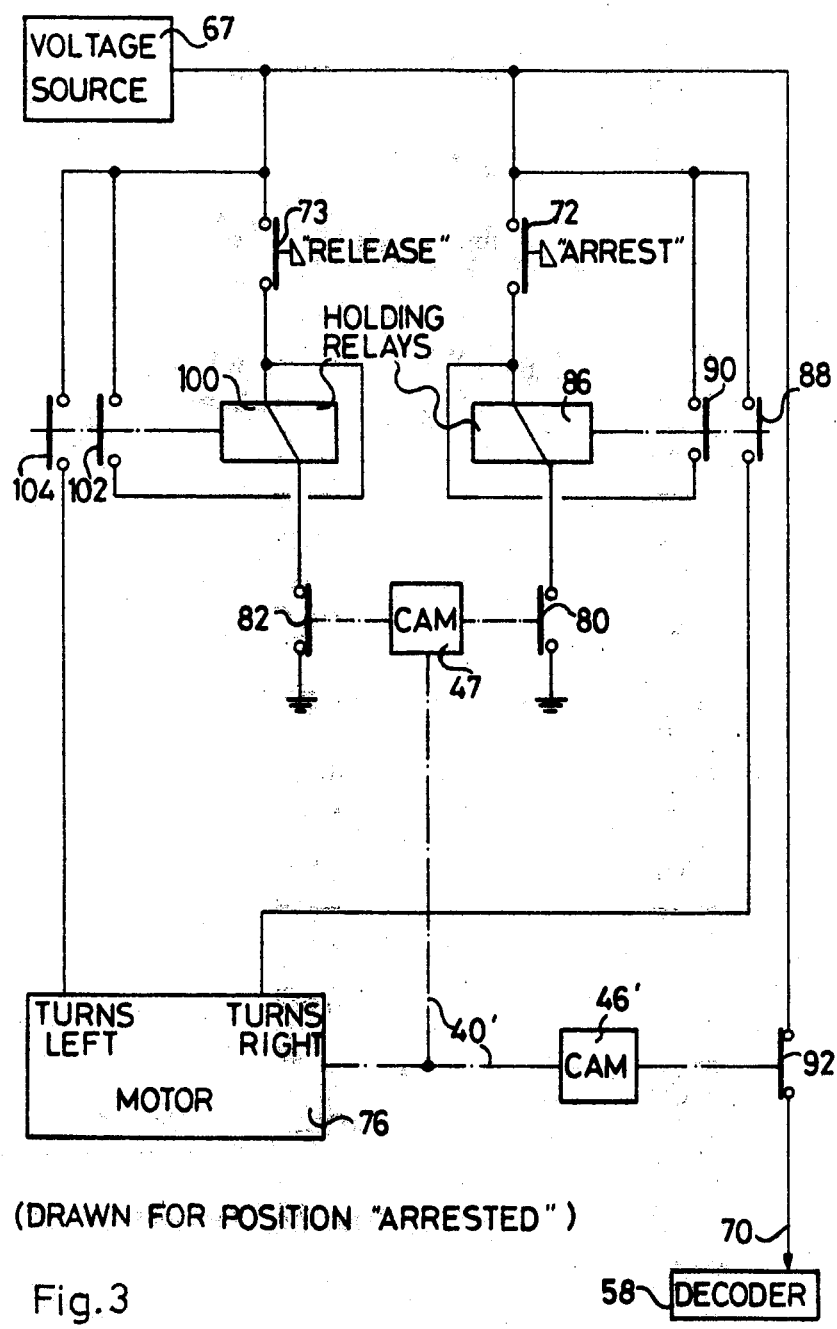
FIG. 3 is a block diagram of a second embodiment of the invention including motor means for operating the balance arresting means upon operation of the display segment illuminating means.

FIG. 3 shows another possibility for controlling the display for monitoring purposes. In this alternative embodiment, a manually operable ARREST switch 72 is provided for energizing a holding relay 86 via switch 80, thereby closing relay contact 88 to energize the reversible electric motor 76, and also to close the holding circuit relay contact 90. The motor 76 drives shaft 40' in one direction to rotate cam 47 so that the motion arresting means 26 is elevated to the beam arresting position, and furthermore to rotate cam 46' to effect closure of microswitch 92 to send an electrical signal to the lamp test input 70 of the decoder 58, whereupon all of the display segments are illuminated. When the arresting device is in its beam arresting position, switch 80 is opened to disable the holding relay 86, and switch 82 is closed to enable the holding relay 100. Upon closing of the "RELEASE" switch 73, holding relay 100 is energized to close the holding contact 102, and also to close switch 104 to cause rotation of motor 76 in the opposite direction. Shaft 40' is then rotated in the opposite direction so that cam 46' effects opening of switch 92 to remove the signal from the lamp test input 70 of decoder 58, and cam 47 is rotated to lower the motion arresting device from the beam 10, and also to open switch 82 to disable the holding relay 100.

An additional effect of the segment monitoring action as described above is that the display 60 which in position O has all its segments illuminated at the same time represents a clearly visible optical means for monitoring switching-on of the balance.

It will be appreciated that the switch as at 48 or 92 could be operatively connected to another component of the arresting mechanism, for example, a linkage lever, and that the switch 48 or 72 may be actuated in any suitable position of the arresting mechanism except generally the weighing or fine weighing position. Although in the case of balances whose arresting mechanism has three positions (arrested position O in FIG. 2, half-arrested position ½ for pre-weighing, and released position I for fine weighing), for example, depending on the configuration of the balance, the "pre-weighing" position could be employed as the position of the arresting device for activating the segments of the display, it will be seen that in the preferred embodiment of the balance as described above, the above-mentioned position in which segments are activated is the arrested position O of the weighing system. On the one hand, there is no weight to be read off in this position (with some kinds of balance, in the "pre-weighing" position a coarse weight appears at the display), and on the other hand the arrested position is the normal rest position of the balance, even when switched on, before and after each weighing operation. It is therefore possible to check correct operation of the display before and after each weighing operation by positive and repeated monitoring of the segments.

While in accordance with the Patent Statutues, the preferred forms and embodiments of the invention have been illustrated and described, it will be apparent to those skilled in the art that various changes and modifications may be made without deviating from the inventive concepts set forth above.

What is claimed is:

1. Weighing apparatus for measuring the mass of a load, comprising
    (a) a scale frame (F);
    (b) a weighing assembly (10, 16) connected with said frame for movement between no-load and load-responsive positions;
    (c) weighing assembly arresting means (26) connected with said frame for movement between arresting and non-arresting positions relative to said weighing assembly, respectively;
    (d) multi-segment display means (60) for displaying weight indicia corresponding to the mass of a load applied to said weighing assembly, said display means including normally deactivated means (70, 59) for illuminating all of the segments of said display means; and
    (e) operating means for displacing said arresting means to a given position and for simultaneously activating said illuminating means to illuminate all of the segments of the display means.

2. Apparatus as defined in claim 1, wherein said operating means includes a switch (48, 92) having first and second positions in which said illuminating means is deactivated and activated, respectively, said switch normally being in its first position.

3. Apparatus as defined in claim 2, wherein said operating means includes a rotary shaft (40) connected with said frame, an arresting assembly cam (42) connected with said shaft for displacing said arresting assembly between its arresting and nonarresting positions, and a switch operating cam (46) connected with said shaft for operating said switch (48) to its second position when the arresting assembly is in its arresting position.

4. Apparatus as defined in claim 2, and further including means including a motor (76) operable to displace said weighing assembly arresting means to its arresting position and for bringing said switch (48, 92) into its second position.

5. Apparatus as defined in claim 4, wherein said motor is a reversible motor, and further including means for operating said motor to displace said weighing assembly to its non-arresting position and for simultaneously de-activating said segment illuminating device.

* * * * *